US011202105B2

(12) United States Patent
Blaney

(10) Patent No.: US 11,202,105 B2
(45) Date of Patent: Dec. 14, 2021

(54) AUTOMATED PRODUCTION OF LIVE EVENTS

(71) Applicant: Sports Information Services Limited, Milton Keynes (GB)

(72) Inventor: Richard Blaney, Moulton (GB)

(73) Assignee: Sports Information Services Limited, Milton Keynes (GB)

( * ) Notice: Subject to any disclaimer, the term of this patent is extended or adjusted under 35 U.S.C. 154(b) by 0 days.

(21) Appl. No.: 16/337,888

(22) PCT Filed: Sep. 28, 2017

(86) PCT No.: PCT/GB2017/052915
§ 371 (c)(1),
(2) Date: Mar. 28, 2019

(87) PCT Pub. No.: WO2018/060715
PCT Pub. Date: Apr. 5, 2018

(65) Prior Publication Data
US 2020/0029102 A1    Jan. 23, 2020

(30) Foreign Application Priority Data

Sep. 29, 2016 (GB) .................................. 1616588

(51) Int. Cl.
*H04N 21/2187* (2011.01)
*H04N 21/235* (2011.01)
(Continued)

(52) U.S. Cl.
CPC ....... *H04N 21/2187* (2013.01); *H04N 21/235* (2013.01); *H04N 21/2668* (2013.01); *H04N 21/84* (2013.01)

(58) Field of Classification Search
None
See application file for complete search history.

(56) References Cited

U.S. PATENT DOCUMENTS

2002/0054244 A1\* 5/2002 Holtz ................. H04N 21/4782
348/722
2010/0242073 A1  9/2010 Gordon et al.
(Continued)

FOREIGN PATENT DOCUMENTS

| EP | 3054690 | 8/2016 |
|---|---|---|
| WO | WO 2009/128904 | 10/2009 |
| WO | WO 2016/098415 | 6/2016 |

OTHER PUBLICATIONS

International Search Report and Written Opinion dated Nov. 17, 2017, from International Patent Application No. PCT/GB2017/052915, 13 pp.

(Continued)

*Primary Examiner* — Jason K Lin
(74) *Attorney, Agent, or Firm* — Klarquist Sparkman, LLP

(57) ABSTRACT

Embodiments of the invention provide a method and system that allows for the automated control of production for live event coverage for broadcast, multicast, or unicast. The automated system takes live video data relating to the coverage of an event and combines it with event related metadata to provide automated play out of the live video data. For example, the event related metadata may concern data relating to the progress of an event that is continuously updated in real-time, commonly used in sporting events for bet settling purposes.

20 Claims, 8 Drawing Sheets

(51) Int. Cl.
*H04N 21/2668* (2011.01)
*H04N 21/84* (2011.01)

(56) References Cited

U.S. PATENT DOCUMENTS

| | | |
|---|---|---|
| 2010/0299703 A1 | 11/2010 | Altman |
| 2011/0296463 A1* | 12/2011 | Suslov ................... H04N 7/173 |
| | | 725/44 |
| 2013/0182117 A1* | 7/2013 | Arseneau .............. G06F 3/0482 |
| | | 348/157 |
| 2014/0189742 A1* | 7/2014 | Hyoung ........... H04N 21/42204 |
| | | 725/44 |
| 2015/0020102 A1* | 1/2015 | Yoo .................. H04N 21/25891 |
| | | 725/41 |
| 2015/0128174 A1 | 5/2015 | Rango et al. |
| 2015/0271534 A1 | 9/2015 | Altman |
| 2016/0277802 A1* | 9/2016 | Bernstein ........... H04N 21/4307 |
| 2017/0280182 A1* | 9/2017 | Matsunaga .............. H04N 5/91 |

OTHER PUBLICATIONS

Search Report dated Mar. 24, 2017, from Great Britain Patent Application No. GB1616588.8, 5 pp.
Communication pursuant to Article 94(3) EPC dated Mar. 18, 2020, from European Patent Application No. 17780171.9, 7 pp.
European Patent Office action in EP 17 780 171.9-1208, dated Nov. 4, 2020, 6 pages.

* cited by examiner

AUTOMATED PRODUCTION OF LIVE EVENTS

CROSS REFERENCE TO RELATED APPLICATIONS

This application is the U.S. National Stage of International Application No. PCT/GB2017/052915, filed Sep. 28, 2017, which was published in English under PCT Article 21(2), which in turn claims the benefit of Great Britain Application No. 1616588.8, filed Sep. 29, 2016, all of which are incorporated herein in their entirety.

TECHNICAL FIELD

Embodiments of the present invention provide a system, and associated apparatus, for automating the coverage production for the broadcast of live events. In particular, some embodiments of the invention combine individual live events into a broadcast channel under automated software control, wherein the automation includes a decision engine responsible for making content relevant coverage decisions, and the interpretation of event status information relating to those events.

BACKGROUND TO THE INVENTION AND PRIOR ART

The coverage of live events such as sporting events for broadcast is ordinarily undertaken by a "gallery" of staff manually undertaking function specific roles with specialised equipment (for example, sound, videotape (VT) replay, graphics overlay, and vision switching), as illustrated in FIG. 1. The hardware requirements and the reliance on these function specific roles makes the manual production of event coverage a labour intensive process, which is turn is costly for the broadcaster. Moreover, due to the large volumes of data being handled in these production galleries, there is an increased chance of human error. Automated play out of pre-recorded content of a fixed duration is commonplace within the broadcast sector. However, this requires a person to manually select a sequence of events to be broadcast. Once the content is being broadcast, the automated play out cannot be changed unless a member of staff manually overrides the coverage to choose one event in favour of another. Therefore, a way of eliminating the requirement for manual production is needed in order to provide automated play out of live content.

SUMMARY OF THE INVENTION

Embodiments of the invention provide a method and system that allows for the automated control of production for live event coverage for broadcast, multicast, or unicast. The automated system takes live video data relating to the coverage of an event and combines it with event related metadata to provide automated playout of the live video data. For example, the event related metadata may concern data relating to the progress of an event that is continuously updated in real-time, commonly used in sporting events for bet settling purposes. In effect, the automated system simulates a traditional broadcast gallery. The system comprises a "director" or "conductor" module and a "display calculation" module. The display calculation module receives and processes the event related metadata and generates a set of instructions that are communicated to and undertaken by the conductor module. These instructions include specified actions such as the order and format of the live video data to be broadcast. On receipt of these instructions, the conductor module translates the instruction into commands that are automatically implemented by video processing hardware and software, the output of which can then delivered to one or more customers. The communication between the conductor module and the display calculation module allows the coverage of multiple live events to be dynamically updated in real-time.

As such, the present invention provides an automated end to end process of channel production for broadcast purposes, the automated process being capable of updating the order and format of coverage in real-time based on the metadata relating to each of the events being broadcast. This allows the coverage of multiple live events to be updated in a flexible, yet reliable way.

A first aspect of the present invention provides a computer implemented live event coverage production method, comprising receiving video data relating to a plurality of live events, receiving in real time metadata relating to the plurality of live events, wherein the metadata comprises data indicative of the progress status of the plurality of live events, sorting the video data, wherein the video data is categorised based on the progress status of the plurality of live events, automatically generating, by a processor, one more instructions for displaying the video data, wherein the one or more instructions comprise a temporal order in which the video data is to be displayed in dependence on the categorisation, and distributing the video data to one or more clients for display on at least one visual display device in dependence on the one or more instructions.

As such, the progress status of the events, for example, whether an event is about to begin, is in progress, or finished, is used to determine the order in which footage of the events should be shown. For example, the plurality events may be several horse races due to take place during a specified period of time. Progress status information may then be used to sort the races into several categories, for example, lining up, false start, under starter's orders, race underway, or race finished. This categorisation, along with other metadata such as start time, may then be used to determine the order in which the events should be shown according to what is happening in them. In this way, if an event was due to start first but has been held up in some way, another event that is underway can be shown instead or at least until the first event has started. As such, this helps to ensure that the clients to which the video data is being distributed do not miss out on event coverage.

The method may further comprise updating the categorisation and the one or more instructions in response to received metadata until the video data has been distributed to the one or more clients for display. As such, as the various events progress, for example, from lining up to being under starter's orders to being underway, the events are re-categorised accordingly and the order in which the video data is to be shown is adjusted correspondingly. For example, if an event was under starter's orders but had a false start, the video data for that event would be re-categorised and moved down the temporal order in favour of another event.

The one or more instructions may also comprise a spatial configuration in which the video data is to be displayed. For example, the instructions may indicate that video data relating to a single event is to be shown on the at least one visual display device. Alternatively, the instructions may indicate that video data relating to two events is to be shown on the at least one visual device.

The received metadata may further comprise data indicative of one or more characteristics of the plurality of live events. For example, the one or more characteristics may comprise one or more of: an event type, an event location, an event duration and a video content source The method may further comprise ranking live events relating to video data having the same categorisation in dependence on one or more characteristics of the said live events. As such, if two or more live events have the same or a similar progress status such that the video data is categorised in the same way such that they are due to be shown at the same time, these two or more events may be further ranked to determine which is of higher priority.

In this case, the one or more instructions further comprise a spatial configuration in which the video data having the same categorisation is to be displayed based on the ranking. For example, the video data relating to an event of a higher rank may be displayed on a larger proportion of a screen of the at least one visual display device than video data relating to an event of a lower rank. As such, those events that are considered to be of higher priority are shown in preference to those of a lower priority.

The ranking may comprise calculating a priority measure for the live events relating to video data having the same categorisation based on the one or more characteristics of said live events. In this respect, the calculating the priority measure may comprise allocating points for each of the one or more characteristics until the live events relating to video data having the same categorisation have a priority measure of a different value.

For example, the allocating points may comprise one or more of the steps: allocating a first set of points for an event type, allocating a second set of points for an event location, allocating a third set of points for an event duration, and allocating a fourth set of points for a video content source, wherein the above steps are followed in order until the live events relating to video data having the same categorisation have a priority measure of different value. As such, points will be awarded to the events for each of its characteristics until the priority measure has a different value.

The generating the one or more instructions may further comprise generating an instruction to provide information relating to the live event shown by the displayed video data on the screen of the at least one visual display device. If the live events are sporting events, the related information may include one or more of: time, location, betting information, participants, upcoming events, and results of past events.

A second aspect of the present invention provides a live event coverage production system, comprising a processor, and a computer readable storage medium storing one or more computer programs, the computer programs operable when executed by the processor to cause the processor to perform a method as outlined above.

A third aspect of the present invention provides a live event coverage production apparatus, comprising a display calculation module arranged to receive video data relating to a plurality of live events, receive in real time metadata relating to the plurality of live events, wherein the metadata comprises data indicative of the progress status of the plurality of live events, sort the video data, wherein the video data is categorised based on the progress status of the plurality of live events, and generate one more instructions for displaying the video data, wherein the one or more instructions comprise a temporal order in which the video data is to be displayed in dependence on the categorisation. The apparatus further comprises a conductor module arranged to receive the one or more instructions generated by the display calculation module, and a video processor, the conductor module being arranged to control the video processor based on the received one or more instructions to generate a live stream of video data for transmission.

The display calculation module may be further arranged to update the categorisation and the one or more instructions in response to received metadata until the live stream of video data has been transmitted.

The one or more instructions may comprise a spatial configuration in which the video data is to be displayed.

The received metadata may further comprise data indicative of one or more characteristics of the plurality of live events. For example, the one or more characteristics may comprise one or more of: an event type, an event location, an event duration and a video content source The display calculation module may be further arranged to rank live events relating to video data having the same categorisation in dependence on one or more characteristics of the said live events.

In this case, the one or more instructions further comprises a spatial configuration in which the video data having the same categorisation is to be displayed based on the ranking. For example, video data relating to an event of a higher rank may be displayed on a larger proportion of a screen of a visual display device than video data relating to an event of a lower rank.

The ranking may comprise calculating a priority measure for the live events relating to video data having the same categorisation based on the one or more characteristics of said live events.

The calculating the priority measure may comprise allocating points for each of the one or more characteristics until the live events relating to video data having the same categorisation have a priority measure of a different value.

For example, the allocating points may comprise one or more of the steps: allocating a first set of points for an event type, allocating a second set of points for an event location, allocating a third set of points for an event duration, and allocating a fourth set of points for a video content source, wherein the above steps are followed in order until the live events relating to video data having the same categorisation have a priority measure of a different value.

The display calculation module may be further arranged to generate an instruction to display information relating to the live event shown by the live stream of video data. If the live events are sporting events, the related information may include one or more of: time, location, betting information, participants, upcoming events, and results of past events.

In another arrangement described herein, a computer implemented live event coverage production method is provided, the method comprising receiving video data relating to one or more live events, receiving in real time metadata relating to the one or more live events, and automatically generating, by a processor, one more instructions for displaying the video data in dependence on the received metadata. As such, the processor continuously generates instructions for display based on the received metadata. If the metadata related to a live event changes, the processor will generate updated instructions for display based on the updated metadata. This method therefore provides automated coverage production for live events that does not require human intervention.

The above method may further comprise distributing the video data to one or more clients for display on at least one visual display device in dependence on the one or more instructions. That is to say, the instructions are executed so as to broadcast the video data to one or more viewers.

The generating the one or more instructions may comprise performing a first algorithm to determine a temporal order and a spatial configuration for the displayed video data. That is to say, the first algorithm makes a decision as to which video data should be broadcast, when it should be broadcast and in what way the video data should be visually output. Because the first algorithm uses the event related metadata to generate the instructions for display, the first algorithm can dynamically change the temporal order and spatial configuration if and when there is an update to the received metadata. For example, the first algorithm can make a decision to change the temporal order if the metadata indicates that one of the live events is behind schedule.

In some arrangements, performing the first algorithm may comprise categorising the video data based on the received metadata and determining the temporal order and spatial configuration of the displayed video data based on said categorisation. For example, the video data may be categorised on the type of event or whether the event has started or not.

The performing the first algorithm may comprise generating an instruction to display the video data in a first display mode, wherein the first display mode is such that video data relating to a single live event is displayed, the video data being configured to comprise the whole of a screen of the at least one visual display device. In this respect, the performing the first algorithm may comprise generating an instruction to display the video data in the first display mode if the metadata indicates that the live event is in progress.

The performing the first algorithm may comprise generating an instruction to display the video data in a second display mode, wherein the second display mode is such that video data relating to a single live event is displayed, the video data being configured to comprise part of a screen of the at least one visual display device. In this respect, the performing the first algorithm may comprise generating an instruction to display the video data in the second display mode if the metadata indicates that the live event has not started.

The performing the first algorithm may comprise generating an instruction to display the video data in a third display mode, wherein the third display mode is such that video data relating to two or more live event is displayed, the video data of the respective live events being configured to comprise part of a screen of the at least one visual display device.

Additionally, the generating the one or more instructions may further comprise performing a second algorithm to rank the received video data, wherein said video data relates to two or more concurrent live events. The ranking may be performed based on a number of factors, for example, the expected finish time of the event, the type of event, the location of the event, whether there is any betting data associated with the event, the duration of the event or any other suitable way of ranking the events.

The performing the first algorithm may then comprise generating the instruction to display the video data in the third display mode in dependence on the ranking determined by the second algorithm, wherein the video data with the highest ranking is configured to comprise a larger portion of the screen of the at least one visual display device. Therefore, where two events are happening at the same time, the event that is considered to be of higher priority will take up a larger portion of the screen.

The generating the one or more instructions may further comprise generating an instruction to provide information relating to the live event shown by the displayed video data on the screen of the at least one visual display device. Such information may overlay the video data or be positioned next to it on a separate portion of the screen.

If the live events are sporting events, the related information may include one or more of: time, location, betting information, participants, upcoming events, and results of past events.

The received metadata may comprise one or more of: the type of live event, the progress status of the live event and the scheduled start time of the live event.

In another arrangement described herein, a live event coverage production system is provided, comprising a processor, and a computer readable storage medium storing one or more computer programs, the computer programs operable when executed by the processor to cause the processor to perform a method, wherein the method comprises receiving video data relating to one or more live events, receiving in real time metadata relating to the one or more live events, and automatically generating, by a processor, one more instructions for displaying the video data in dependence on the received metadata.

According another arrangement described herein, a live event coverage production apparatus is provided, comprising a display calculation module arranged to receive video data and metadata relating to one or more live events, and generate instructions for displaying the video data in dependence on the received metadata, a conductor module arranged to receive the instructions generated by the display calculation module, and a video processor, the conductor module being arranged to control the video processor based on the received instructions to generate a live stream of video data for transmission.

Further aspects, features, and advantages of embodiments of the present invention will be apparent from the appended claims.

BRIEF DESCRIPTION OF DRAWINGS

Embodiments of the present invention will now be described by way of example only, and with reference to the accompanying drawings in which like reference numerals refer to like parts, and wherein.

DETAILED DESCRIPTION OF DRAWINGS

The present invention provides a system that automates the end to end process of a channel production for broadcast purposes. The system receives live video data relating to a collection of events such as a sporting event, along with event related metadata, and processes the event related metadata to determine which events should be broadcast, when they should be broadcast and how those events should be visually output to the viewer watching those events on a visual display device. The event related metadata includes data relating to the progress of the events, the type of event, the scheduled start time of the event and other various factors that will be described below.

The system has two aspects; a display calculation module that processes the video data and metadata to generate instructions as to how and when the video data should be broadcast, and conductor module that controls video and audio hardware so as to execute the instructions and thereby broadcast the video data. The display calculation module operates by running a decision engine to make decisions as to how and when the video data should be broadcast, the decision engine being triggered every time new metadata is received. That is to say, when a metadata update is received, the display calculation module will automatically run the decision engine and generate updated instructions for display based on the new information. These updated instructions will then be implemented by the conductor module so as to update the coverage accordingly. As such, the system dynamically updates the video feed without human intervention based on live event updates.

Additionally, in cases where two events are taking place at the same time, the display calculation module is able to prioritise between these two events using a priority engine to thereby make a decision as to which event will be more important to the viewer. Based on the results of this prioritisation, the display calculation module will instruct the conductor module to display the higher priority event in some preferential way, for example, by showing it on a larger portion of the screen.

Figure 1:
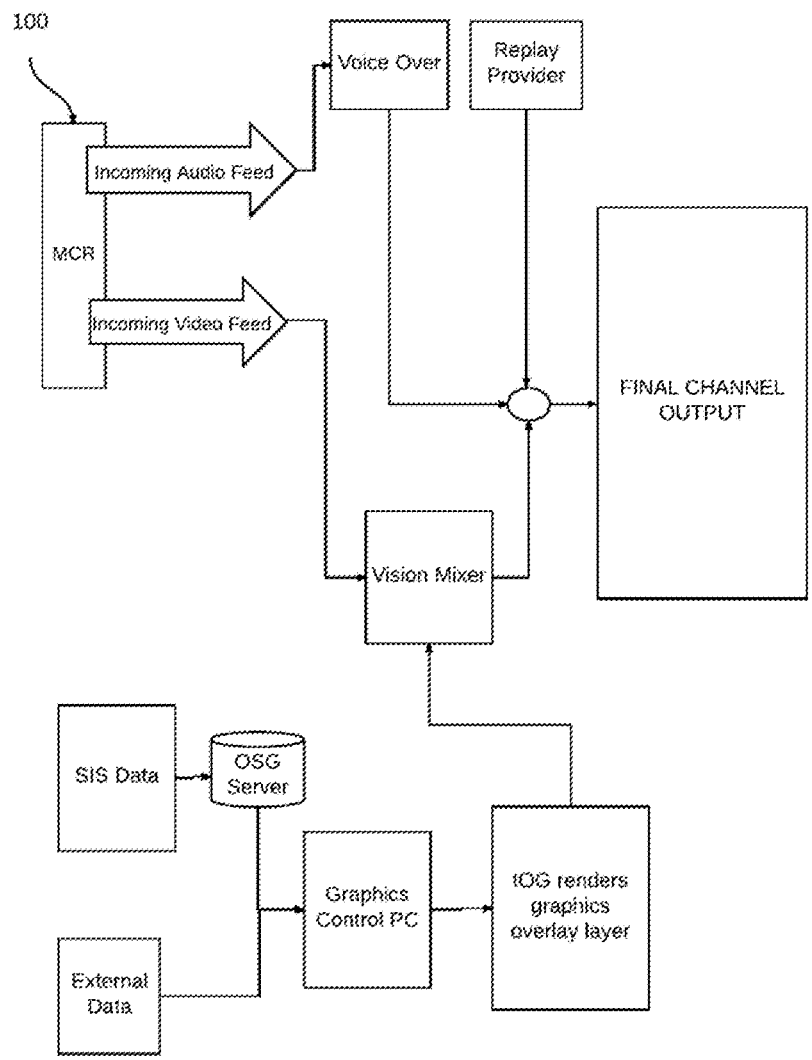
FIG. 1 is a block diagram illustrating the system elements of a production gallery known in the art.
Figure 2:
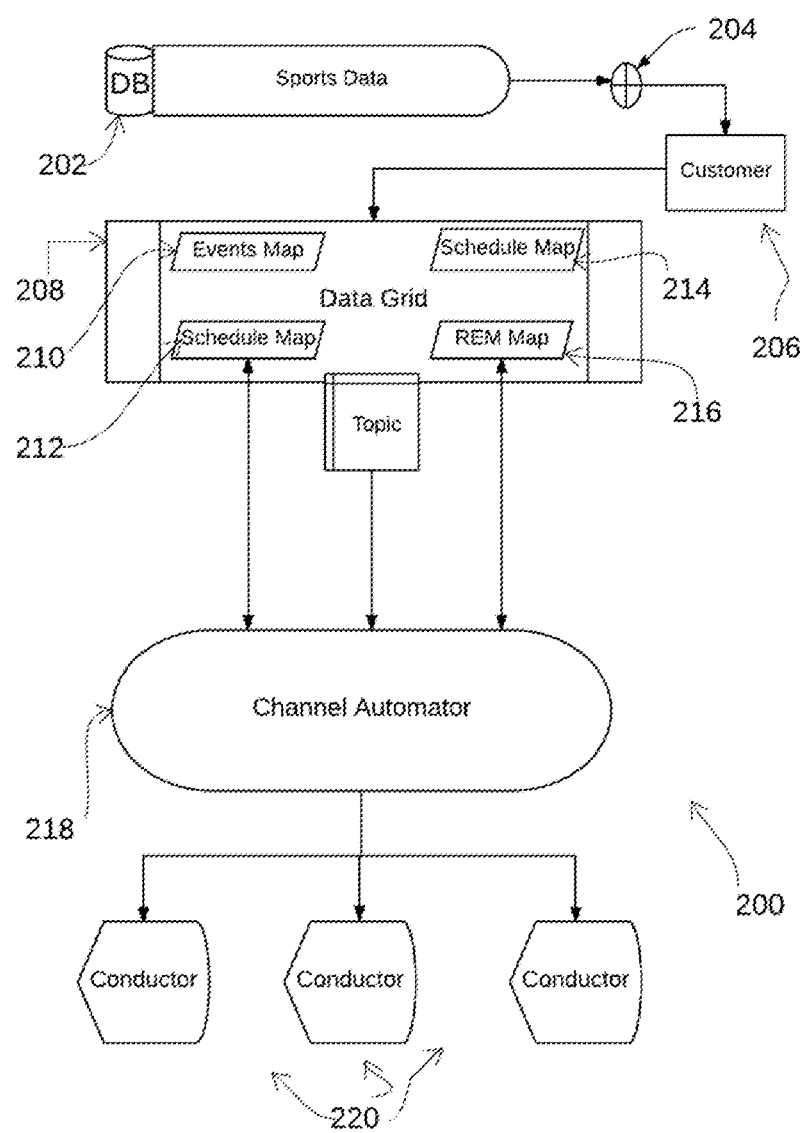
FIG. 2 is a block diagram of the system elements in an embodiment of the invention.

FIG. 2 illustrates the components of the complex automated production system 200 described herein. The system 200 comprises a database 202 storing fundamental data relating to a plurality of live events, for example, information relating to a plurality of live sporting events that are to take place on a particular day. This event data is then sent to a customer data queue 204 where the data files are queued ready to be sent for consumption by a customer 206. The customer 206 may be, for example, a broadcaster that airs sporting events and may be configured to have multiple services, wherein a service can contain one or more schedules that collectively define the set of events to be aired each day. The files sent to each customer 206 may be in any suitable format, for example, XML, HTML, CSS or the like. Event data is provided by the customer 206 to a data feed such as the data grid 208 shown in FIG. 2, the data grid 208 being updated in real time to reflect the ongoing state of the live events throughout the day. The data grid 208 includes various data, including but not limited to, an events map 210, a schedule map 212, a meetings map 214 and a remote (REM) mappings map 216. The events map 210 includes data relating to the individual events taking place that day, the schedule map 212 includes information relating to the schedule of events, the meetings map 214 includes information relating to a group of events (for example, a series of horse races taking place at the same location) and the REM mappings map 216 includes data from a remote video source, that is, a third party supplying the live video footage of the event. In this respect, REM mapping refers to the ability to assign a unique ID to a remote video source (one not generated local to the production) such that the system 200 can include its content in the output.

Each customer 206 has configurable filters which identify combinations that the customer 206 is interested in airing. For example, the filters may include venue, race type, duration or any other suitable filter relating to the live events taking place. The customer 206 uses these filters to query the data grid 208 in order to obtain a list of events for the day. Each customer 206 receives event updates from the data grid 208 and will consume any update that corresponds to its event list for the day. Consumption of an event update will trigger the display calculation module 218 or "channel automator" to determine which event should be broadcast, as will be described in detail below. In doing this, the schedule information, REM mappings data and event update information is sent to the channel automator 218. The channel automator 218 generates a set of coverage instructions, each of which will generate a video output via audio and visual hardware under the control of one or more conductors 200. As such, the system 200 automates the delivery of a video output to each of the customers 206.

Figure 3:
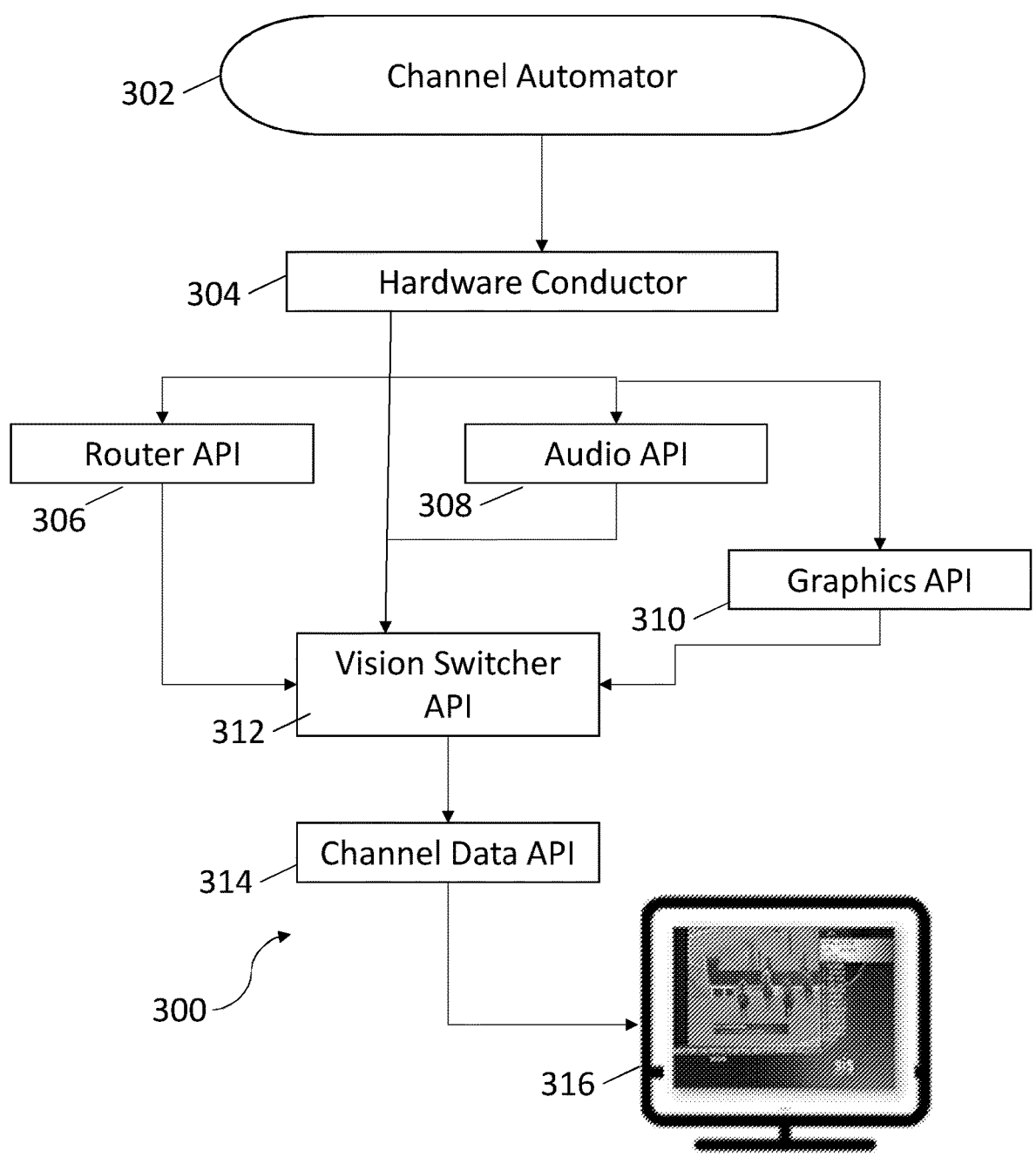
FIG. 3 is a block diagram further illustrating system elements used in an embodiment of the invention.

As illustrated by FIG. 3, on receipt of the coverage instructions from the channel automator 302, the conductor 304 communicates the instructions to a number of application programming interfaces (API), for example, a router API 306, an audio API 308 and a graphics API 310. The router API 306 dictates which channel the video and audio of each event should be routed to, the audio API 308 is some suitable audio mixing software that prepares the audio associated with the footage of each event and the graphics API 310 prepares other associated graphics such as betting information to be displayed with the live footage of the event. The data from each of these APIs is then sent to a vision switcher API 312 where each of the components are compiled together. The compiled display data may then be passed through a channel data API 314 where it is provided with other visual effects such as a clock showing the time or a logo associated with the channel on which the event is to be broadcast, before being output to the channel for broadcast to viewers via a visual display 316.

Figure 4:
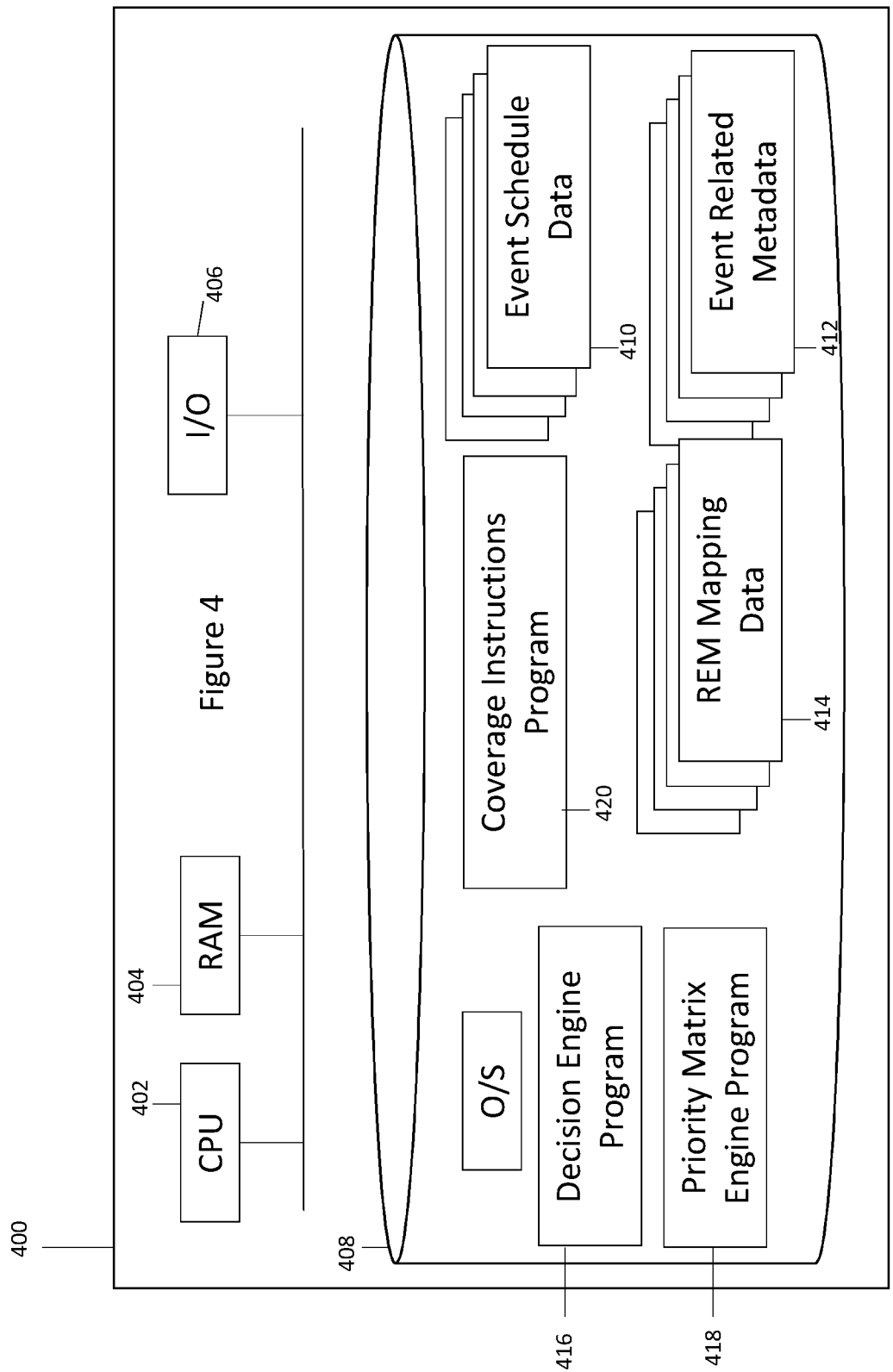
FIG. 4 is a block diagram further illustrating one of the system elements of FIG. 2.

FIG. 4 illustrates an example of the channel automator 400 implemented on a general purpose computer system, the channel automator 400 having a central processing unit 402, random access memory 404 for storing executable programs and data, and one or more input and output ports 406 for receiving input and output data via various input and output devices. Also provided as part of the channel automator 400 is a computer readable storage medium 408, such as a hard disk drive, solid state drive, flash storage, or the like, upon which is stored the operating system for the channel automator 400, as well as various control programs and data.

In particular, a coverage instructions program 420 is provided that in use acts to receive data from the data grid 208 to determine which events should be broadcast, in which order and in which format, and thereby generate coverage instructions based on this determination. The generated coverage instructions may then be output via the I/O port 406 to one or more conductors 220, wherein the coverage instructions are implemented for broadcast. The coverage instructions program 420 makes use of a decision engine program 416 to process event schedule data 410, event related metadata 412 (for example, data relating to the progress of an event) and REM mapping data 414 to generate coverage instructions. The coverage instruction program 420 also makes use of a priority matrix engine program 418 to determine how two or more events should be broadcast where those events are scheduled to take place at the same time. The priority matrix engine program 418 uses event related metadata 414 such as type of event, length of event, betting data, location of event and any other suitable data to rank simultaneously occurring events. The coverage instructions program 420 will then use this ranking to determine how these simultaneously occurring events should be broadcast.

Figure 5:
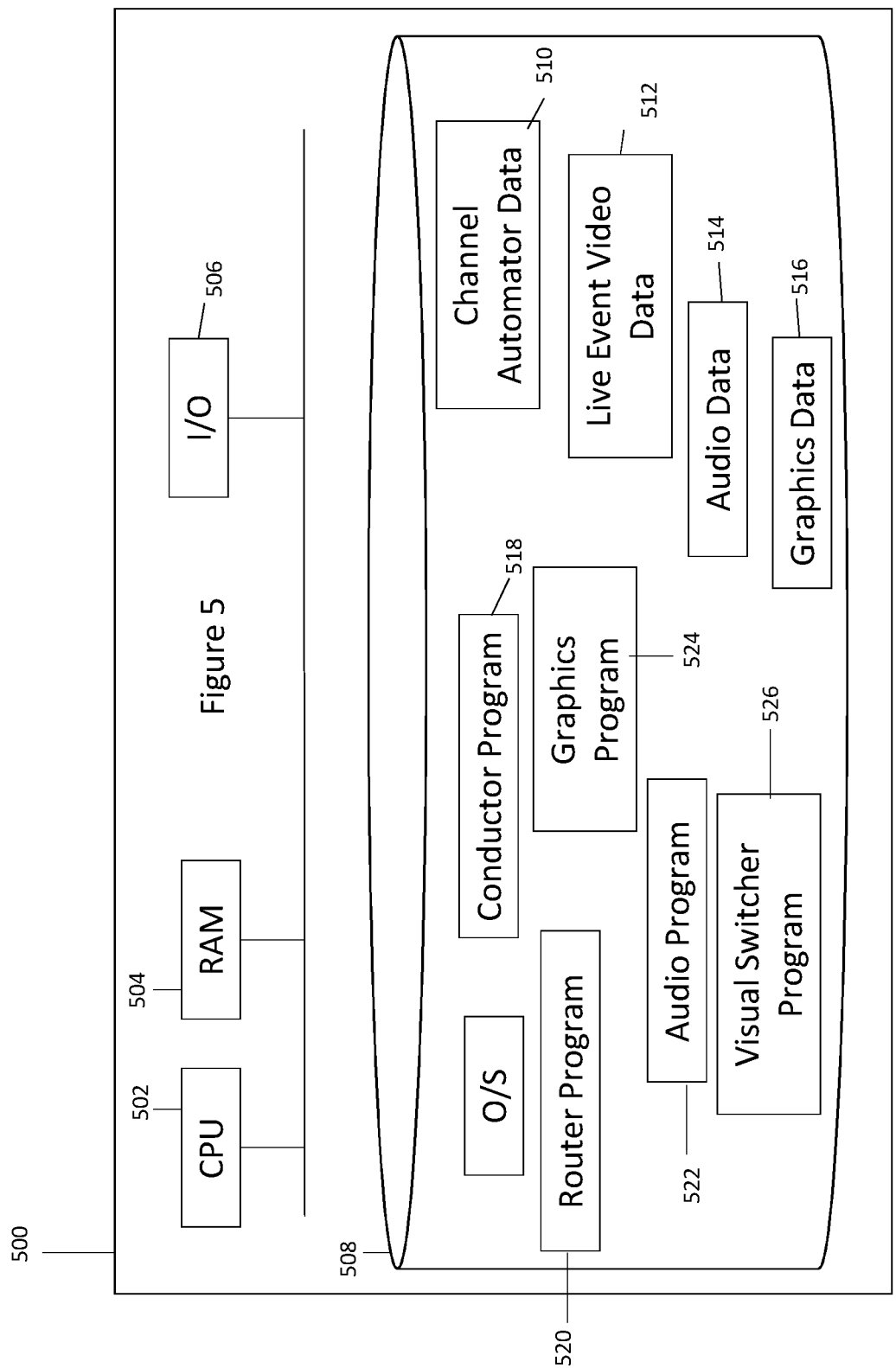
FIG. 5 is a block diagram further illustrating another of the system elements of FIG. 2.

FIG. 5 illustrates an example of the conductor 500 implemented on a general purpose computer system, the conductor 500 having a central processing unit 502, random access memory 504 for storing executable programs and data, and one or more input and output ports 506 for receiving input and output data via various input and output devices. Also provided as part of the channel automator 500 is a computer readable storage medium 508, such as a hard disk drive, solid state drive, flash storage, or the like, upon which is stored the operating system for the channel automator 500, as well as various control programs and data.

In particular, a conductor program 518 is provided that in use acts to receive channel automator data 510 received from the channel automator 218, the channel automator data 510 comprising a set of coverage instructions. The conductor program 518 then implements the channel automator data 510 using a router program 520, an audio program 522, a graphics program 524 and a visual switcher program 526 to produce a visual and audio output that is output via the port 506 to one or more channels for broadcast, where it will then be displayed to viewers via any suitable visual display device. On receipt of the channel automator data 510, the conductor program 518 instructs the router program 520 to allocate the correct live event video data 512 and audio data 514 to the correct channels. At the same time, the conductor program 518 instructs the audio program 522 to prepare the audio data 514 so that it is suitable for broadcast, and instructs the graphics program 518 to prepare any graphic data 516 that is to be displayed with the video data 512. The graphics data 516 may include betting information, schedule information or any other information relating to the events being broadcast, including past and future events. The output from the router program 520, audio program 522 and graphics program 524 is then sent to a visual switcher program 526 to be compiled as a single composite display output. As described previously, before distributing to the relevant channels, the conductor program 518 may implement further software programs so as to provide the display output with further visual effects such as a clock or logo specific to the broadcasting channel.

In FIGS. 4 and 5, the channel automator 218 and conductor 220 are implemented on separate general purpose computing systems, however, it will be appreciated that these system elements may be executed by the same operating system such that the control programs and data of the both the channel automator 218 and the conductor 220 are stored on the same computer readable storage medium.

The steps of the processing performed by the channel automator 218 will now be described in more detail.

Channel Automator

As described with reference to FIG. 2, the channel automator 218 is a module that processes incoming event related data from a data feed 208. The channel automator 218 makes decisions regarding the temporal order and spatial configuration of event coverage based on data triggers that are fed into a decision engine program 416 and a priority matrix engine program 418. Additionally, it generates instructions regarding event information that should be displayed with each of the events. For example, it may generate text detailing information regarding upcoming events. An example of such text may be where there are reserve horses or a jockey change from the scheduled running of a horse race. As another example, the text may also relate to betting odds for an upcoming event. Such text may be included with the video output generated via the conductor 220 and broadcast to the channel to keep viewers informed of upcoming events.

Figure 6A:
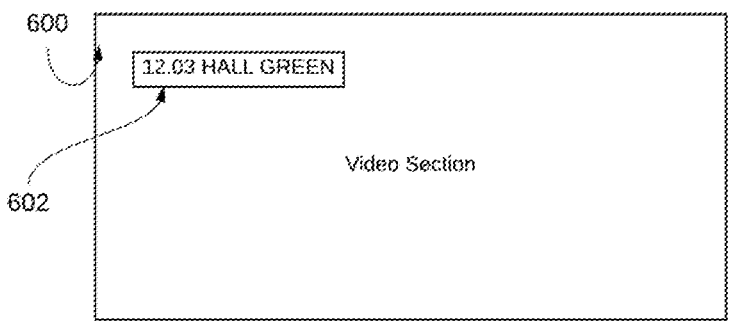
FIG. 6a-c illustrate examples of the output generated by an embodiment of the invention.
Figure 6B:
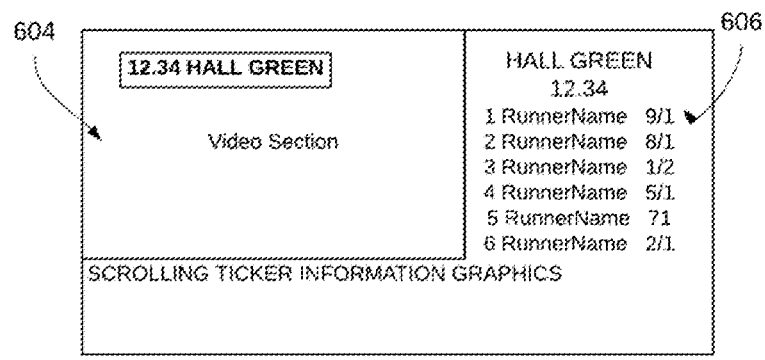
Figure 6C:
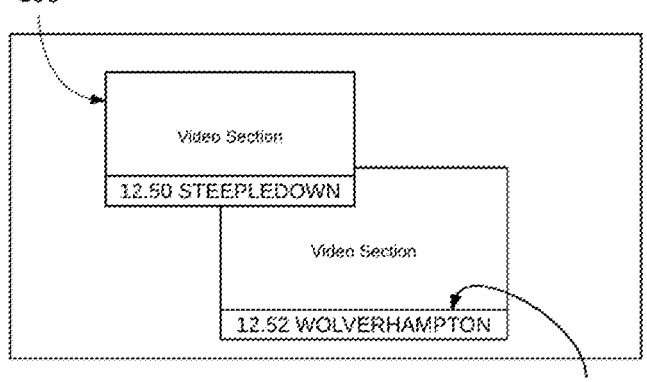

One aspect of the coverage instructions generated by the channel automator 218 is the format of the video output to be generated by the conductor 220. Preferably, the format of the video output has three distinct modes; full screen, partial screen (or so-called "squeezeback") and split screen, as illustrated by FIGS. 6*a*-*c*. The decision as to which display mode the video data is output in is made by decision engine program 416, as will be described below.

When in full screen mode, as shown by FIG. 6*a*, the event is shown on the whole of the screen 600 with only a strap 602 indicating to viewers the time and location of the event. In some instances, the video output will be in full screen mode once the event has started, but may be in partial screen mode beforehand. For example, the 2 o'clock race at Doncaster races may be shown in full screen if there are no other horse races or dog races happening at 2 o'clock that day.

In partial mode, as illustrated in FIG. 6*b*, the video output 604 is shown on a portion of the screen, with the rest of the screen being used for event related text. In this example, the non-video portion 606 is displayed as a reverse L-shape with information regarding the upcoming event, for example, betting odds and runners displayed along the right hand side, and a news bar at the bottom displaying information about events scheduled for later in the day and a ticker which amongst other things, displays results from previous races. It will however be appreciated that any suitable layout may be used. For example, prior to the 2 o'clock race at Doncaster, the live video feed of Doncaster race course may be shown in partial mode whilst the horses are lining up. In the non-video portion 606, information regarding the horses, jockeys and trainers may be included, along with the betting odds for each horse. Additionally, information regarding the results of previous races at Doncaster or any other race course may be provided. Similarly, information regarding upcoming races at Doncaster or any other race course may be provided.

In split screen, as illustrated by FIG. 6*c*, two video outputs 608, 610 are displayed on the screen, wherein one video 608 may be smaller than the other 610. Split screen mode is generally used when there are two events running at the same time, allowing the channel to broadcast both events simultaneously. In this respect, the channel automator 218 will implement the priority matrix engine 418, as will be described below, to prioritise the two events, pushing one of the events to the big screen 610 and the lower priority event to the smaller screen 608. For example, the 2 o'clock race at Doncaster may clash with the 2 o'clock dog race at Wimbledon Greyhound Stadium. The channel automator 218 will use the priority matrix engine 418, which may determine that the 2 o'clock race at Doncaster has a higher priority than the race at Wimbledon. Therefore, the 2 o'clock at Doncaster will be shown in the larger screen portion 610, whilst the 2 o'clock at Wimbledon will be shown in the smaller screen portion 608. As with partial screen mode, information relating to the current races, as well as past and future may be included on the screen.

Decision Engine

The process by which a decision is made regarding which event should be broadcast will now be described.

In order to simplify the logic of the processes implemented by the decision engine program 416, the progress of all events is categorised. For example, the events may be categorised as follows:

UPCOMING—an unfinished event that is not READY or RUNNING

READY—an unfinished event with progress code of (E, J, K, L)

RUNNING—an unfinished event with progress code of (H, O)

FINISHED—the event has a final result or the event has a result element with a finish status code of (A=first past post, T=event coverage ended) or the event has a result element with a settling status of V (void)

In the context of horse racing and dog racing, the progress codes may be as follows:

null 6
"X" 6
"A" 5//Dogs: PARADING
"B" 5//Horses: GOING DOWN
"C" 4//Horses: AT THE POST, Dogs: APP. TRAPS
"M" 4//BETTING SUSPENDED
"E" 3//Horses: GOING BEHIND, Dogs: GOING IN TPS
"L" 3//Horse: LINING UP
"J" 3//Horses: WHITE FLAG, Dogs: HARE STOPPED
"K" 3//Horses: FALSE START Dogs: TRAPS FAILED
"H" 2//Horses: UNDER ORDERS, Dogs: HARE RUNNING
"P" 1//OFF Any code not in the above list is treated as priority 6, with 6 being the lowest priority.

Figure 7:
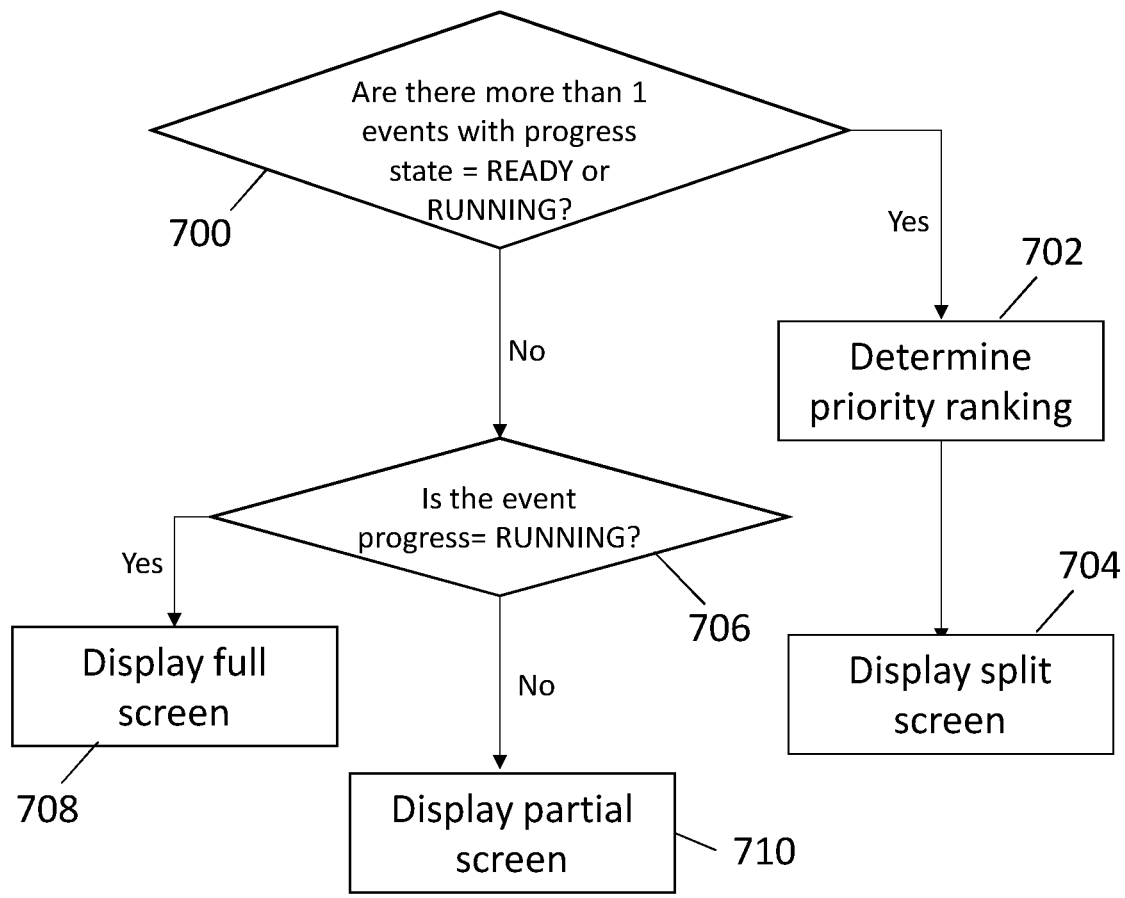
FIG. 7 is a flow diagram illustrating a software process according to an embodiment of the invention.

The decision engine program 416 will then perform an "assign events" process to determine the order and format of the video output to be broadcast by the channel, the steps of the process being illustrated by FIG. 7. The decision engine program 416 first establishes whether there is more than one event with a progress state of READY or RUNNING (step 700). That is to say, whether there are two or more events scheduled to take place at the same time. If the answer is yes, the decision engine program 416 will send a request to the priority matrix engine program 418 to determine a priority ranking of the two or more events (step 702). In dependence on the outcome of this priority ranking, the decision engine program 416 will issue an instruction to the conductor 220 to display the video output of the two or more events in split screen mode (step 704), as shown in FIG. 6c, with the highest priority event being displayed on the larger screen 610. The priority ranking process will be described in more detail below.

If there is only one event with a progress state of READY or RUNNING, the decision engine program 416 will determine whether the event has started, that is, has a progress state of RUNNING (step 706). If the event has begun, the decision engine program 416 will issue an instruction to the conductor 220 to display the video output of the event in full screen mode (step 708), as shown in FIG. 6b. If the event has not yet begun, that is, has a status of READY or UPCOMING, the decision engine program 416 will issue an instruction to the conductor 220 to display the video output of the upcoming event in partial screen mode (step 710), as shown in FIG. 6b. In this case, where there is one event waiting to start (READY) and/or multiple UPCOMING events, the video output relating to the highest priority event based on the above priority codes will be broadcast.

As well as event progress state, the decision engine program 416 may also take into account event-specific user actions such as skip, take, hold, next, prioritise, first past post, and the like. In the event of data failure affecting multiple events, the channel automator 218 control of the video displays will be suspended and switched to manual control.

Future Events

The decision engine program 416 will line up future events according to their progress status, the above priority codes and scheduled start time, wherein the earliest start time is considered to be a higher priority. For example, where there are two events with priority code "B", or one with priority code "B" and one with priority code "A", and thus are of equal priority, the event with the earlier start time will be broadcast first.

Since future events are lined up according to their progress status, priority code and scheduled start time, with the progress status and priority code being the first "lining up" parameter, any events that deviate from their scheduled start times will still be handled in the correct way. For example, consider an event that was scheduled to start at 13.00 hours and a second event scheduled to start at 13.10 hours. If the event related metadata 412 was still showing the first event as UPCOMING: C (priority level 4) at 13.10, whilst the second event is shown as RUNNING: H (priority level 2), the decision engine program 416 will instruct the conductor 220 to broadcast the second event instead of the first event. The conductor 220 will continue to broadcast the second event until the decision engine program 416 receives event related metadata 412 indicating that the first event is RUNNING and will then issue an instruction to the conductor to switch to split screen mode to thereby broadcast both events.

The user may be able to manually indicate that an event has finished by clicking a "First Past the Post" button, causing the event result finish status code to be set to "A". When an on air event being broadcast in full screen mode transitions to event progress state FINISHED in this way, it may remain on air until a replay has been shown and the final result has been received. If during this post-finish period another un-skipped event in the service schedule transitions to priority code "E" or higher, then the post-finish event may be taken off air immediately without waiting for the result.

The decision engine program 416 is also capable of making a decision not to broadcast an event. For example, the decision engine program 416 may instruct the conductor 220 not to broadcast the video output of an event if the event related metadata 412 indicates that the event has been abandoned or is void, if the decision engine program 416 has received an instruction from the user to skip the event or to continue watching another event already being broadcast, or if the broadcast of such an event will prevent the broadcast of another event (for example, because it has a higher priority ranking).

Once an event finishes, a replay may be shown provided there is sufficient time until the next scheduled event or that no other scheduled unfinished events have progress codes higher than "X", and provided the "skip replay" option has not been selected by the user for the event. These replays can be run in slow motion in order to give a clear indication of the outcome of the race.

A custom event always has a progress code of "X". This means it will only ever be broadcast of its own accord in the event that all other unfinished events are at progress code "X" and the custom event has the earliest start time. In other words, it will automatically be broadcast at its scheduled start time provided there is no other progress among the other scheduled events. A custom event can also be broadcast at any time by using the "take" option. If a user no longer wishes to view a custom event, the skip option can be exercised.

Priority Matrix Engine

The process by which two simultaneously scheduled events are prioritised will now be described.

Figure 8:
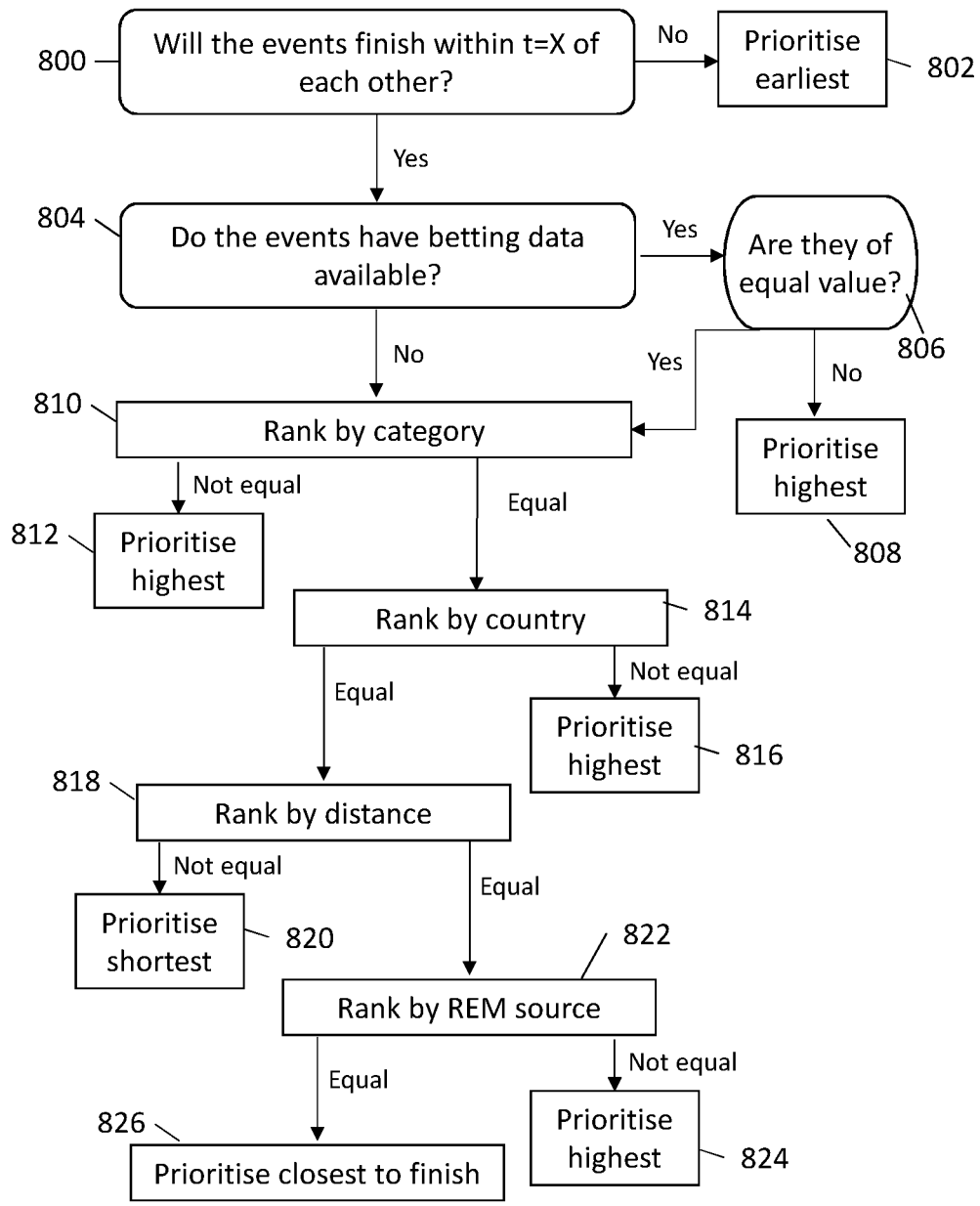
FIG. 8 is a flow diagram illustrating a software process according to an embodiment of the invention.

If the decision engine program 416 determines that more than one event has a progress status of READY or RUNNING, that is, two or more events are scheduled to take place at the same time, it will send a request to the priority matrix engine program 418 to prioritise the two or more events. FIG. 8 illustrates the steps of the process performed by the priority matrix engine program 418.

Firstly, the priority matrix engine program 418 will rank the two or more events based on the time they are expected to finish. If an event is already "OFF", that is, it has already started, then an accurate start time can be determined. Otherwise, it is estimated by taking the later of the time at that moment and the scheduled start time, also taking into account the type of event and the progress status at that time. For example, if the scheduled start time is 11:20:00, the current time is 11:19:50, the event is a horse race and the current progress code is B, then the estimated start time is likely to be several minutes after 11:20:00. To establish a more accurate estimate of the start time, the transition time between progress codes is taken, plus a number of additional seconds obtained from a lookup table based on category and progress code. The race duration can be estimated based on category, distance and whether there are any hurdles. From the start time (whether this be actual or estimated) and the estimated race duration, an estimated finish time for each event can be determined.

The priority matrix engine program 418 will then establish whether the two or more events are expected to finish within a certain amount of time of each other, for example, within 45 seconds of each other (step 800). If they are not, the earliest finishing event will be prioritised (step 802).

If they are expected to finish within the specified time, the priority matrix engine program 418 will determine whether there is any betting data available for either of these two events (step 804), such data being obtained from a third party source. If the value of this betting data is different (step 806), for example, there are higher odds for one of the events, the priority matrix engine program 418 will prioritise the event that is of higher value to customer (step 808).

If the value of this betting data is equal, that is, the events have similar odds, the priority matrix engine program 418 will rank the event based on the event category (step 810). For example, horse races may be allocated 8 points, dog races allocated 5 points and other sports allocated 1 point. Where the ranking is not equal, the event with the highest amount of points will be prioritised (step 812).

If the ranking is equal, the priority matrix engine program 418 will then rank the events based on the country in which they are taking place (step 814). For example, events taking place in the UK may be allocated 8 points, events in Ireland allocated 7 points, events in the United Arab Emirates allocated 6 points, events in France allocated 5 points, events in South Africa allocated 4 points, events in the US allocated 3 points, events in Australia allocated 2 points and events in any other country allocated 1 point.

If the ranking is not equal, the event with the highest amount of points will be prioritised (step 816). If the ranking is equal, the priority matrix engine program 418 will rank the events based on distance (step 818). For example, races that are less than a mile may be allocated 2 points, races between 1 and 2 miles allocated 1 point and races more than 2 miles allocated 0 points. Again, if the ranking is not equal, the event with the highest number of points, that is, the shortest will be prioritised (step 820).

If the ranking is equal, the priority matrix engine program 418 will rank the events based on the REM source supplying the video data for each event (822). If the ranking is not equal, the highest scoring event will be prioritised (step 824). Finally, if after this, the ranking is still equal, the priority matrix engine program 418 will query the status of the live event to determine which is closest to the finish in real-time and set this as the priority event (step 826).

Once the events have been prioritised, the priority matrix engine program 418 will issue instructions to the conductor 220 to display the video output of the two or more events in the split screen mode, as shown in FIG. 6c, with the higher priority event being shown in the larger screen 610.

Take for example, a horse race at Cheltenham race course estimated to finish at 15.51.30 and a horse race at Dublin race course estimated to finish at 15.51.45. As they are expected to finish within 45 seconds of each other, the priority matrix engine program 418 will determine whether there is any betting data available for the two races (step 804). If both races have favourites with odds at 2/1, the priority matrix engine program 418 will then rank them based on the category of the event (step 810). Since they are both horse races, they will receive an equal ranking. Therefore, the priority matrix engine program 418 will then rank them based on the location of the race (step 814). Based on the example given above, the horse race in Cheltenham would receive 8 points, whilst the race in Dublin would receive 7 points. Consequently, the race in Cheltenham would be considered a higher priority, and the priority matrix engine program 418 would instruct the conductor to display the Cheltenham race in the larger screen 610.

Although embodiments of the invention have been described above, it will be appreciated that various changes or modifications may be made without departing from the scope of the disclosure, as defined in the appended claims. It will also be apparent that features of these different embodiments can be combined both with one another and also with features of the prior art arrangements described herein in order to achieve the advantages of the disclosure.

The invention claimed is:

1. An automated computer implemented live event coverage production method, comprising:
  receiving video data relating to a plurality of live events;
  receiving in real time metadata relating to the plurality of live events, wherein the metadata comprises data indicative of a progress status of the plurality of live events and data indicative of one or more characteristics of the plurality of live events;
  sorting the video data using a channel automator, the channel automator comprising a decision engine and a priority matrix engine, wherein the video data is categorised based on the progress status of the plurality of live events using the decision engine;
  responsive to two or more video data relating to live events being given the same categorisation by the decision engine, sending a request to the priority matrix engine to prioritise the two or more video data relating to live events;
  ranking the two or more live events relating to video data having the same categorisation in dependence on one or more characteristics of the said live events using the priority matrix engine, wherein a live event with a higher rank will be a higher priority event and a live event with a lower rank will be a lower priority event, and wherein the one or more characteristics comprises an expected finish time and the ranking comprises:
    ranking the two or more events based on the expected finish time by:
      estimating the expected finish times of the two or more events, establishing whether the two or more events are expected to finish within a predetermined amount of time of each other, and responsive to the two or more events not being expected to finish within the predetermined amount of time of each other, giving an earlier finishing event a higher priority than a later finishing event;

automatically generating, by the channel automator, one more instructions for displaying the video data, wherein the one or more instructions comprise a temporal order in which the video data is to be displayed in dependence on the categorization and a spatial configuration in which the video data having the same categorisation is to be displayed based on the ranking, the instructions being issued to a conductor module, and wherein the spatial configuration is such that video data relating to the higher priority event is to be displayed on a larger proportion of a screen of at least one visual display device than video data relating to the lower priority event;

automatically producing, by the conductor module, a live stream output of video data in accordance with the one or more instructions, wherein the live stream output comprises an arrangement of the video data relating to the plurality of live events; and distributing the live stream output of video data by broadcast, multicast or unicast to a plurality of clients for display on at least one visual display device in dependence on the one or more instructions.

2. A method according to claim 1, further comprising updating the categorisation and the one or more instructions in response to received metadata until the video data has been distributed to the plurality of clients for display.

3. A method according to claim 1, wherein the one or more characteristics comprise one or more of: an event type, an event location, an event duration and a video content source.

4. A method according to claim 1, wherein the generating the one or more instructions further comprises generating an instruction to provide information relating to the live event shown by the displayed live stream output of video data on the screen of the at least one visual display device.

5. A method according to claim 4, wherein the live events are sporting events and the related information includes one or more of: time, location, betting information, participants, upcoming events, and results of past events.

6. An automated live event coverage production system, comprising:

a processor; and a non-transitory computer readable storage medium storing one or more computer programs, the computer programs operable when executed by the processor to cause the processor to perform a method, the method comprising:

receiving video data relating to a plurality of live events;

receiving in real time metadata relating to the plurality of live events, wherein the metadata comprises data indicative of a progress status of the plurality of live events and data indicative of one or more characteristics of the plurality of live events;

sorting the video data using a channel automator, the channel automator comprising a decision engine and a priority matrix engine, wherein the video data is categorised based on the progress status of the plurality of live events using the decision engine;

when two or more video data relating to live events are given the same categorisation by the decision engine, a request is sent to the priority matrix engine to prioritise the two or more video data relating to live events;

ranking the two or more live events relating to video data having the same categorisation in dependence on one or more characteristics of the said live events using the priority matrix engine, wherein a live event with a higher rank will be a higher priority event and a live event with a lower rank will be a lower priority event, and wherein the one or more characteristics comprises an expected finish time and the ranking comprises:

ranking the two or more events based on the expected finish time by:

estimating the expected finish times of the two or more events, establishing whether the two or more events are expected to finish within a predetermined amount of time of each other, and when the two or more events are not expected to finish within the predetermined amount of time of each other, an earlier finishing event is given a higher priority than a later finishing event;

automatically generating, by the channel automator, one more instructions for displaying the video data, wherein the one or more instructions comprise a temporal order in which the video data is to be displayed in dependence on the categorization and a spatial configuration in which the video data having the same categorisation is to be displayed based on the ranking, the instructions being issued to a conductor module, and wherein the spatial configuration is such that video data relating to the higher priority event is to be displayed on a larger proportion of a screen of at least one visual display device than video data relating to the lower priority event;

automatically producing, by the conductor module, a live stream output of video data in accordance with the one or more instructions, wherein the live stream output comprises an arrangement of the video data relating to the plurality of live events; and distributing the live stream output of video data by broadcast, multicast or unicast to plurality of clients for display on at least one visual display device in dependence on the one or more instructions.

7. An automated live event coverage production apparatus, comprising:

a display calculation module having a processor and memory for storing executable programs and data, the display calculation module being arranged to:

receive video data relating to a plurality of live events;

receive in real time metadata relating to the plurality of live events, wherein the metadata comprises data indicative of a progress status of the plurality of live events and data indicative of one or more characteristics of the plurality of live events;

sort the video data using a decision engine, wherein the video data is categorised based on the progress status of the plurality of live events;

when two or more video data relating to live events are given the same categorisation by the decision engine, a request is sent to a priority matrix engine to prioritise the two or more video data relating to live events;

rank the two or more live events relating to video data having the same categorisation in dependence on one or more characteristics of the said live events; using the priority matrix engine, wherein a live event with a higher rank will be a higher priority event and a live event with a lower rank will be a lower priority event, and wherein the one or more characteristics comprises an expected finish time and the ranking comprises:
  ranking the two or more events based on the expected finish time by:
    estimating the expected finish times of the two or more events;
    establishing whether the two or more events are expected to finish within a predetermined amount of time of each other;
    when the two or more events are not expected to finish within the predetermined amount of time of each other, an earlier finishing event is given a higher priority than a later finishing event; and
  generate one or more instructions for displaying the video data, wherein the one or more instructions comprise a temporal order in which the video data is to be displayed in dependence on the categorization and a spatial configuration in which the video data having the same categorisation is to be displayed based on the ranking, the instructions being issued to a conductor module, and wherein the spatial configuration is such that video data relating to the higher priority event is to be displayed on a larger proportion of a screen of at least one visual display device than video data relating to the lower priority event;
  the conductor module having a processor and memory for storing executable programs and data, the conductor module being arranged to receive the one or more instructions generated by the display calculation module; and
  a video processor;
  the conductor being arranged to control the video processor based on the received one or more instructions to generate a live stream output of video data for transmission via broadcast, multicast or unicast, the live stream output comprising an arrangement of the video data relating to the plurality of live events.

8. An apparatus according to claim 7, wherein the display calculation module is further arranged to update the categorisation and the one or more instructions in response to received metadata until the live stream output of video data has been transmitted.

9. An apparatus according to claim 7, wherein the one or more characteristics comprise one or more of: an event type, an event location, an event duration and a video content source.

10. An apparatus according to claim 7, wherein the display calculation module is further arranged to generate an instruction to display information relating to the live event shown by the live stream of output video data, and wherein the live events are preferably sporting events and the related information includes one or more of: time, location, betting information, participants, upcoming events, and results of past events.

11. A method according to claim 1, wherein if the two or more events are expected to finish within the predetermined amount of time of each other, the ranking further comprises:
  determining whether there is any betting data available for any of the two or more events;
  if the value of the betting data differs between the two or more events, the priority matrix engine will give a higher priority to an event that is of higher value to a customer.

12. A method according to claim 11, wherein if the value of the betting data is equal, the priority matrix engine uses event category information, and the ranking further comprises:
  allocating points to the two or more events according to predetermined event category point allocations;
  if the points allocated to the two or more events are not equal, an event with a higher amount of points will be given a higher priority than an event with a lower amount of points.

13. A method according to claim 12, wherein if the points allocated to the two or more events are equal, the priority matrix engine uses information regarding countries in which the two or more events are taking place, and the ranking further comprises:
  allocating points to the two or more events according to predetermined country point allocations;
  if the points allocated to the two or more events are not equal, an event with a higher amount of points will be given a higher priority than an event with a lower amount of points.

14. A method according to claim 13, wherein if the points allocated to the two or more events are equal, the priority matrix engine uses information regarding how far from the customer the two or more events are taking place, and the ranking further comprises:
  allocating points to the two or more events according to a predetermined distance prioritisation system;
  if the points allocated to the two or more events are not equal, an event with a higher amount of points will be given a higher priority than an event with a lower amount of points.

15. A method according to claim 1, wherein estimating the expected finish times of an event of the two or more events comprises:
  if the event has already started, determining an accurate start time;
  otherwise, estimating a start time by choosing whichever is later of a current time and a scheduled start time and taking into account an event type and a current progress status;
  estimating race duration based on an event type, event distance and whether there are any hurdles;
  estimating the expected finish time of the event using a start time, the start time comprising the accurate start time or the estimated start time, and the estimated race duration.

16. An apparatus according to claim 7, wherein if the two or more events are expected to finish within the predetermined amount of time of each other, the ranking further comprises:
  determining whether there is any betting data available for any of the two or more events;
  if the value of the betting data differs between the two or more events, the priority matrix engine will give a higher priority to an event that is of higher value to a customer.

17. An apparatus according to claim 16, wherein if the value of the betting data is equal, the priority matrix engine uses event category information, and the ranking further comprises:
  allocating points to the two or more events according to predetermined event category point allocations;
  if the points allocated to the two or more events are not equal, an event with a higher amount of points will be given a higher priority than an event with a lower amount of points.

18. An apparatus according to claim 17, wherein if the points allocated to the two or more events are equal, the priority matrix engine uses information regarding countries in which the two or more events are taking place, and the ranking further comprises:

allocating points to the two or more events according to predetermined country point allocations;

if the points allocated to the two or more events are not equal, an event with a higher amount of points will be given a higher priority than an event with a lower amount of points.

19. An apparatus according to claim 18, wherein if the points allocated to the two or more events are equal, the priority matrix engine uses information regarding how far from the customer the two or more events are taking place, and the ranking further comprises:

allocating points to the two or more events according to a predetermined distance prioritisation system;

if the points allocated to the two or more events are not equal, an event with a higher amount of points will be given a higher priority than an event with a lower amount of points.

20. An apparatus according to claim 7, wherein estimating the expected finish times of an event of the two or more events comprises:

if the event has already started, determining an accurate start time;

otherwise, estimating a start time by choosing whichever is later of a current time and a scheduled start time and taking into account an event type and a current progress status;

estimating race duration based on an event type, event distance and whether there are any hurdles;

estimating the expected finish time of the event using a start time, the start time comprising the accurate start time or the estimated start time, and the estimated race duration.

* * * * *

UNITED STATES PATENT AND TRADEMARK OFFICE
CERTIFICATE OF CORRECTION

| | |
|---|---|
| PATENT NO. | : 11,202,105 B2 |
| APPLICATION NO. | : 16/337888 |
| DATED | : December 14, 2021 |
| INVENTOR(S) | : Blaney |

It is certified that error appears in the above-identified patent and that said Letters Patent is hereby corrected as shown below:

In the Claims

Column 15,
Lines 9-10, "one more instructions" should be --one or more instructions--

Column 16,
Lines 24-25, "one more instructions" should be --one or more instructions--

Signed and Sealed this
Tenth Day of October, 2023

Katherine Kelly Vidal
*Director of the United States Patent and Trademark Office*